July 23, 1929.  J. V. BURKE  1,722,127
SANDWICH TOASTER
Filed Oct. 10, 1928

INVENTOR.
Joseph V. Burke
BY
ATTORNEY.

Patented July 23, 1929.

1,722,127

UNITED STATES PATENT OFFICE.

JOSEPH V. BURKE, OF MARIEMONT, OHIO.

SANDWICH TOASTER.

Application filed October 10, 1928. Serial No. 311,628.

This invention relates to sandwich toasters and more particularly to the hinge mechanism for automatically leveling the upper cooking plate relative to the lower cooking plate.

The objects of this invention are to provide a hinge mechanism, as above referred to, which is simple, efficient convenient and economical to manufacture.

The invention consists in the novel construction, combination, location and arrangement of parts, as herein fully set forth and claimed.

Figure 1:
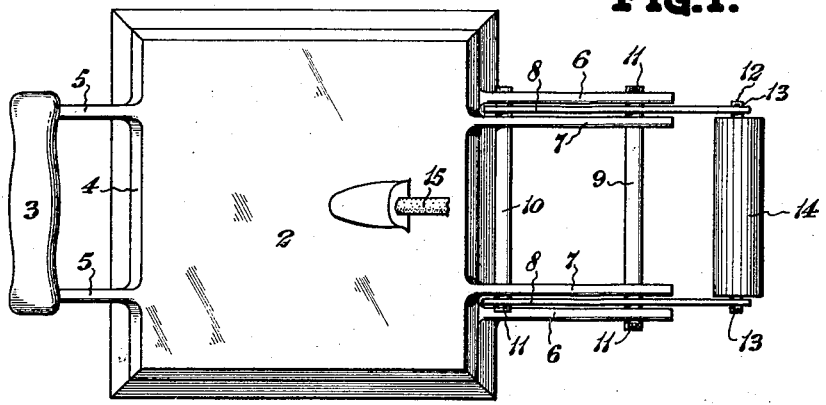
Fig. 1 is a plan view of a conventional sandwich toaster shown in connection with my novel automatic leveling hinge.

In the embodiment of my invention as illustrated and which shows a preferred construction I provide a sandwich toaster comprising, generally, lower cooking plate 1 and upper cooking plate 2, said cooking plates each being provided with a suitable heating unit or element. Handle 3 is conveniently located at the front 4 of upper cooking plate 2 and is mounted upon the outer ends of arms 5, said arms being preferably formed integral with said upper cooking plate 2, as clearly shown in Fig. 1. Extending rearwardly from the lower cooking plate 1, and preferably integral therewith, are curved supports 6. The outer end of each arm 7, extending rearwardly from upper cooking plate 2 and preferably formed integral therewith, is bifurcated, and the bifurcated end portions 7ª and 7ᵇ form stops, the purpose of which will be explained more fully hereinafter.

Figure 2:
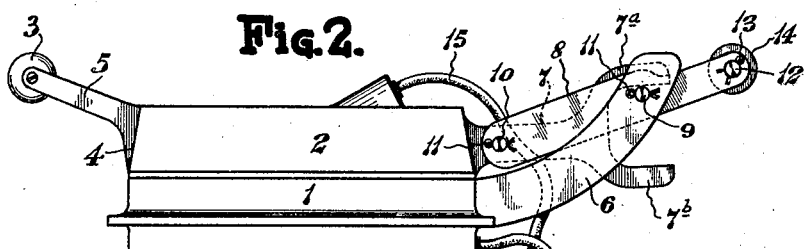
Fig. 2 is a side elevation of Fig. 1 showing the upper cooking plate resting on the lower cooking plate.

Links 8 are pivoted upon shaft 9, said shaft being carried by the outer end of curved supports 6 and said links are also pivoted upon shaft 10, carried by arms 7, as clearly shown in Figs. 1 and 2, respectively. The shafts 9 and 10, respectively, are held within the arms 7, links 8, and supports 6, in any suitable manner, as, for example, by cotter pins 11 passing through the ends of said shafts.

The outer ends of links 8 carry shaft 12, which shaft is held therein by cotter pins 13 and a counterweight 14 is received over said shaft and between said links, as illustrated in Fig. 1.

*Operation.*—When in operation the upper cooking plate is heated by a heating element (not shown) through conductor 15 and the lower cooking plate 1 is heated by a similar heating element (not shown) through conductor 16. Said conductors and heating elements, however, are not a part of this invention but are briefly described to show one adaptation of the improved automatic leveling hinge construction.

Figure 3:
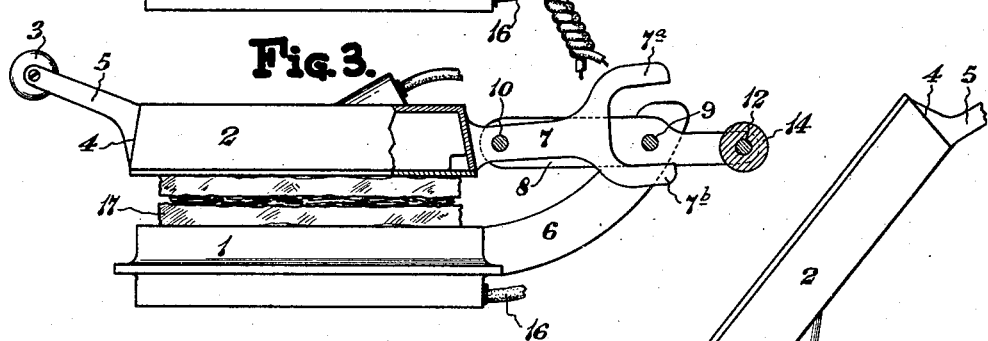
Fig. 3 is a side elevation similar to Fig. 2 showing the position of the upper cooking plate relative to the lower cooking plate when a sandwich is inserted therebetween.
Figure 4:
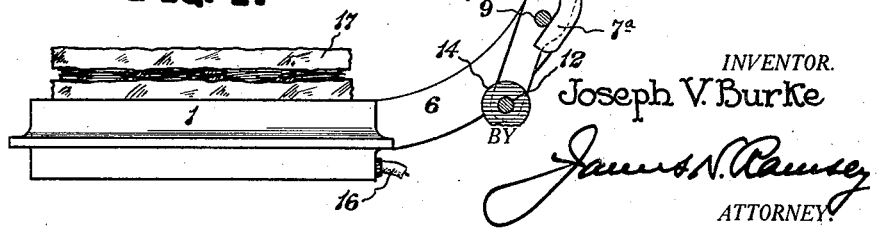
Fig. 4 is a view similar to Fig. 3 with the upper cooking plate shown in the open or raised position.

Assuming now that the upper cooking plate 2 and lower cooking plate 1 are being heated and that a sandwich, designated 17, is placed upon the lower cooking plate 1, as shown in Fig. 4, all that is necessary now to toast the sandwich is to grasp handle 3 and lower the upper cooking plate 2 until it rests upon the top of sandwich 17, as shown in Fig. 3.

Due to the upper cooking plate 2 being connected to lower cooking plate 1 through links 8 (said links being pivoted to the lower plate at one point and to the upper plate at another point) it will be clearly apparent that the plate 2 will always rest level upon the sandwich 17 and, therefore, evenly toast both the top and bottom of said sandwich simultaneously. Thus plate 2 will automatically adjust itself to level position upon sandwiches of varying thicknesses, or if one side is cut thinner than the other will adapt itself thereto.

After the sandwich has been sufficiently toasted, grasp handle 3 and raise upwardly until the upper cooking plate assumes the position shown in Fig. 4. Said cooking plate is held in this raised or open position by stops 7ª coming in contact with shaft 9 and by the projecting ends of links 8 engaging against shaft 12, as clearly shown in Fig. 4.

When the upper cooking plate 2 is in the position shown in Fig. 4, to lower said cooking plate grasp the handle 3, as before stated. As the upper cooking plate 2 is drawn forward by the handle it is pivoted upon the shaft 10, thus the stop 7ᵇ will be drawn towards shaft 9. When the stops 7ᵇ engage the shaft 9 said cooking plate 2 is stopped from moving on shaft 10 and moves with the links 8 which are pivoted upon shaft 9.

The counterweight 14 assists in automatically leveling the upper cooking plate 2 upon the sandwich 17 and in addition relieves weight of the upper cooking plate to prevent crushing of the sandwich.

In this specification and the annexed drawing, the invention is described and illustrated in the form considered to be best, but it is understood that the hinge construction is not limited to such form, because it may be employed in other forms, and it is also to be understood that in and by the claims herein it is desired to cover the invention in whatsoever form it may be employed.

Having thus described my invention, what I claim as new and desire to secure by Letters Patent is:

1. In a sandwich toaster of the character described, a lower cooking plate, curved supports extending laterally therefrom, an upper cooking plate, arms extending laterally therefrom, a pair of links pivoted to the inner ends of said arms, and to said supports, respectively, a counterweight carried by said links, and a handle fixed to said upper cooking plate whereby the latter can be moved towards and from said lower cooking plate at various angles to toast sandwiches of non-uniform and uneven thicknesses.

2. In a sandwich toaster having a lower cooking plate and an upper cooking plate, a pair of supports on said lower cooking plate and extending laterally therefrom, a pair of arms on said upper cooking plate and extending laterally therefrom, the ends of which are bifurcated to form stops, a shaft carried by said supports, a shaft carried by said arms, a pair of links pivotally connected to said shafts, a counterweight carried by said links, and means for holding said support, arms, links and shafts in pivotal engagement with each other.

3. A sandwich toaster of the character described, comprising in combination a lower cooking plate, a pair of supporting brackets fixed to the rear of said lower cooking plate, a shaft carried by said brackets, a pair of links pivotally mounted upon said shaft, an upper cooking plate, a pair of arms fixed on the rear of said upper cooking plate, a shaft carried by said arms and pivotally attached to the inner end of said links whereby said upper cooking plate is hingedly attached to said lower cooking plate and adapted to be moved towards and from said lower cooking plate at various angles and to be moved to an inoperative outward position with respect to said lower cooking plate when desired.

JOSEPH V. BURKE.